3,408,305
Patented Oct. 29, 1968

3,408,305
MODIFIED MONTMORILLONITE CONTAINING EXCHANGEABLE AMMONIUM CATIONS AND PREPARATION THEREOF
Andrew Torok, Morris Plains, N.J., assignor to Georgia Kaolin Company, Elizabeth, N.J., a corporation of New Jersey
No Drawing. Continuation-in-part of application Ser. No. 437,599, Mar. 5, 1965. This application Nov. 22, 1965, Ser. No. 509,687
11 Claims. (Cl. 252—317)

ABSTRACT OF THE DISCLOSURE

Novel compositions of matter, each comprising modified montmorillonite whose exchangeable cations consist essentially of calcium and/or magnesium, ammonium and also or neither sodium and/or lithium. Each of said montmorillonites contains specified milliequivalents of calcium and/or magnesium and specified milliequivalents of ammonium per 100 grams thereof and if they contain sodium and/or lithium, no more than a certain number of milliequivalents of sodium and/or lithium per 100 grams thereof, said compositions of matter are substantially free of water soluble, ionizable alkaline earth compounds, also novel systems comprising said compositions of matter and water soluble ionizable sodium and/or lithium compounds in amount sufficient to provide available sodium and/or lithium at least equivalent to the total amount of exchangeable ammonium and exchangeable calcium and/or magnesium ions in said montmorillonte. Also a novel method for removing cristobalite from the montmorillonite in a naturally occurring alkaline earth bentonite comprising forming an aqueous slurry of said bentonite which was rendered slakeable and then with or without removing the quartz component therefrom treating and agitating the slurry with a water soluble ammonium compound, whose anions are capable of insolubilizing alkaline earth cations, to replace alkaline earth cations in said montmorillonite with ammonium and to insolubilize said replaced cations, the quantity of said compound being such that the alkaline earth cations are substituted by ammonium in amount sufficient that the particle size of the montmorillonite therein is less than that of the cristobalite and less than 0.1 micron and then separating the crystobalite therefrom, as by centrifuging.

---

This application is a continuation-in-part of my copending application Ser. No. 437,599 filed Mar. 5, 1965, now abandoned.

This invention is directed to novel compositions of matter and to methods for producing them. In one of its more specific aspects, the invention is directed to modified naturally occurring bentonites and also to modified clay-mineral components of naturally occurring bentonites and to novel compositions of matter in which one or more of said modified components are part thereof and also to novel methods for producing said modified components and comositions of matter.

The crude naturally occurring raw alkaline earth bentonites generally consist essentially of approximately 50–70 parts of alkaline earth montmorillonites, approximately 40–20 parts of cristobalite, approximately 10 parts of sand or quartz (with or without approximately 3 parts of physically combined iron oxide), and approximately 35 parts of equilibrium water per 100 parts of the combined weights of the other components therein. When heated to drive off sufficient water to render them slakeable, 5% aqueous dispersions thereof have viscosities at 250 C. of such low value, as to be practically immeasurable with a Brookfield viscosimeter. Also when said slakeable alkaline earth bentonites are pugged or otherwise intimately combined with about 7% by weight of sodium carbonate, the resulting systems have poor properties as evidenced by 10% aqueous thereof have viscosities no greater than about 500 centipoises at 25° C.

The crude naturally occurring sodium bentonites on the dry basis, contain higher percentages of montmorillonites than do the alkaline earth bentonites. They commonly contain at least 90% of sodium montmorillonites and small amounts of solid nonmontmorillonite fractions. The slakeable sodium bentonites produced by removing water from the naturally occurring sodium bentonites may be water-slurried and then the nonmontmorillonite fractions are separated therefrom. The so refined sodium montmorillonites may be dried and when 5% aqueous colloidal suspensions thereof are produced, they have viscosities of approximately 500 centipoises at 25° C. Five percent aqueous colloidal suspension of systems produced by intimately mixing 100 parts of the dried refined sodium montmorillonite and 7 parts of sodium carbonate have viscosities of about 1200 centipoises at 25 ° C.

According to this invention, naturally occurring bentonites, which are the so-called "sodium bentonites" and the "alkaline earth bentonites" are treated in various unique ways to produce the novel products of this invention.

In one more specific aspect of this invention, said naturally occurring bentonites and the clay-mineral components, montmorillonites, therein are treated to provide unique modified clay-mineral components thereof which are termed "modified montmorillonites" in the present description and claims and which differ from the montmorillonites naturally occurring therein by having substituted therein certain cations for other exchangeable cations therein.

In another aspect of this invention, said naturally occurring bentonites are treated in various unique ways thereby to provide unique modified clay-mineral compositions of high purity and of exceptionally good color and being substantially free of solid nonmontmorillonite components originally present in the naturally occurring bentonites.

In still another aspect of this invention, the naturally occurring bentonites are treated in various unique ways to provide unique modified montmorillonites having unexpected combinations of properties.

According to another aspect of this invention, improved systems are obtainable by intimately mixing together (F) sodium bentonites, or alkaline earth bentonites or the montmorillonites thereof, either modified or unmodified in accordance with this invention, with (K) mixtures consisting of (x) sodium carbonate and (y) sodium acetate. The sodium acetate serves as a pH buffering agent and also as a stabilizing agent in the aqueous colloidal suspensions produced with said systems. The amount of (x) and (y) for said systems are about 3–6 parts of (x) and about 2–4 parts of (y), in each of 100 parts of montmorillonite or the unique modified montmorillonite in (F). It is preferred that the amount of (x) in said systems be at least as great as the amounts of (y). A preferable mix of (x) and (y) which I employ with 100 parts of montmorillonites or the unique modified montmorillonites, consists of 4.5 parts of (x) and 2.5 parts of (y) and this particular mix is known as Mix AC. "Mix AC" hereinafter used measures 7 parts and consists of 4.5 parts of (x) and 2.5 parts of (y).

According to one other aspect of this invention, the clay-mineral fractions or montmorillonite components of said naturally occurring bentonites are treated with appropriate reactants to replace exchangeable cations thereof with ammonium, with or without replacing in whole or in part other exchangeable cations therein with certain cations which differ therefrom thereby to provide modified montmorillonites which are characterized by containing at least 5, and preferably at least 10 but no more than about 60 and preferably no more than about 55 milliequivalents of exchangeable ammonium cations; at least 5 and preferably at least 10 but no more than 65 and preferably no more than 60 milliequivalents of exchangeable calcium and/or magnesium cations; and 0–20, both inclusive, milliequivalents of exchangeable sodium and/or lithium cations per 100 grams thereof.

According to this invention 5 to about 50 milliequivalents of exchangeable sodium per 100 grams of said sodium montmorillonites are substituted by corresponding numbers of milliequivalents of exchangeable ammonium cations by treating same with sufficient ammonium carbonate to effectuate the substitution. Said so modified sodium montmorillonites have unexpectedly improved properties when in a system consisting of 100 parts thereof and Mix AC. Also according to this invention, some of the remaining exchangeable sodium cations in said so modified montmorillonites are substituted by alkaline earth cations, and preferably in such degree that the milliequivalents of exchangeable alkaline earth cations therein measure about 5–40 milliequivalents per 100 grams thereof, said further modified montmorillonites have the startling unexpected gelling property as evidenced by the viscosities and stability of 5% aqueous colloidal dispersions of prepared systems, produced by intimately combining 100 parts of said further modified montmorillonites with Mix AC.

According to one of the more specific aspects of this invention, the clay-mineral fractions, that is the montmorillonite components of said naturally occurring bentonites are treated with certain appropriate reactants to replace exchangeable cations thereof with other exchangeable cations thereby to provide the so modified clay-mineral fractions or montmorillonites, which are characterized: by containing (I) exchangeable cations selected from the group consisting of (a) calcium, (b) magnesium and (c) mixtures of (a) and (b) in all proportions; (II) exchangeable ammonium cations; with or without (III) exchangeable cations selected from the group consisting of sodium and/or lithium; and by containing at least 5 milliequivalents of (I) and at least 5 milliequivalents of (II) per 100 grams thereof. In a still more specific aspect, the milliequivalents of (I) per 100 grams of the unique modified montmorillonites is preferably at least 10 in some instances, and preferably 15, 20, 25, 30, 35, 40, 45, 50, 55 and 60 in others, and in some instances are preferably in the range of 15–40, and more preferably 20–35; the milliequivalents of (II) per 100 grams thereof is preferably at least 10 in some instances, and preferably 15, 20, 25, 30, 35, 40, 45, 50, 55 and 60 in other instances, and in some instances are preferably in the range of 25–55 and more preferably 30–55. The cations of said unique modified montmorillonites consist essentially of (I) and (II) and the others thereof, if any, are (III). The maximum milliequivalents of (III) if present therein are no more than 20, and preferably no more than 15, 10 or 5 per 100 grams thereof. However, it is most preferable that the milliequivalents of (III) per 100 grams of said unique modified montmorillonites be approximately 0, that is the number of milliequivalents of (III) per 100 grams thereof be less than 5 and optimumly none be present.

According to another specific aspect of the invention, said naturally occurring alkaline earth (calcium and/or magnesium) bentonites are treated in various unique ways to separate therefrom the nonmineral fractions or components thereof and recover unique chemically modified clay-mineral fractions thereof in highly purified conditions. Said recovered unique fractions have unexpected properties and unexpected combination of properties making them useful in the fields of foods, cosmetics and pharmaceuticals.

Still, also according to this invention there are provided novel and unique modified montmorillonites from those present in said sodium and alkaline earth bentonities. Said novel modified montmorillonites have the following unexpected properties and unexpected combination of properties:

(1) The naturally occuring alkaline earth bentonites cannot be refined by merely dehydrating them and then rehydrating them and then subjecting the aqueous mass to centrifuging techniques. This is believed due to the fact that said bentonites which commonly contain quartz, cristobalite and alkaline earth montmorillonites contain the latter two components when in water in such particle size that they cannot commercially be separated by centrifuging. These naturally occurring bentonites when treated in accordance with this invention modifies the clay-mineral or montmorillonite fraction so that the particle size thereof when in water is of such value, that the quartz component may be easily removed commercially therefrom by screening for example and the cristobalite component may be removed commercially, by centrifuging, and the chemically modified montmorillonite component substantially free of the undesirable quartz and cristobalite components is obtained.

(2) Some of said unique modified montmorillonites have the unexpected property of being readily dispersible in water to provide low viscosity and stable colloidal dispersions when 5 parts by weight thereof are dispersed in 95 parts by weight of water. Some of said dispersions have viscosities below 100 centipoises at 25° C. Some of said novel dispersions have the unexpected property of pH values below 9 and as low as about 8.

(3) Some of said modified montmorillonites have the additional startling, unexpected property that the viscosity of a 5%% aqueous colloidal suspension thereof may be increased by increasing or decreasing the pH thereof and the original suspension as well as those of increased or decreased pH values in the range of about 1–12 are stable, will not flock and upon standing at 25° C. remain uniform or homogeneous and will not bleed or have water separate out.

(4) All of those unique modified montmorillonites, which contain at least 10 milliequivalents of exchangeable alkaline earth cations per 100 grams thereof, have the additional startling, unexpected property that in spite of having considerable and appreciable amounts of exchangeable calcium and/or magnesium therein, they may be added directly to certain other components used in cosmetic, food and pharmaceutical products in the course of their preparation and react with one or more of them thereby to increase appreciably the viscosity thereof when in an aqueous medium; and also may, if desired, by dry blended with said other components whereby reaction occurs and after which when added to water, high viscosity, stable, nonbleeding novel compositions of matter are produced.

(5) Said unique montmorillonites may be either dry or wet (water) blended with a mixture of sodium carbonate and sodium acetate, or with sodium chloride alone thereby to produce unique masses or compositions of matter. Five percent aqueous dispersions of said unique masses or compositions of matter (on a dry basis) have high viscosities when compared with the viscosities of 5% aqueous dispersions of similar systems but in which there are used the natural or original montmorillonites from which the unique montmorillonites were derived.

Vast deposits of the so-called "Western" or sodium bentonites occur in Wyoming, Montana, Utah, Colorado and the Dakotas. These clays occur in the natural state as high swelling, high gelling and high viscosity clays. However, there are many more deposits of alkaline earth bentonites throughout the world. The alkaline earth bentonites possess the valuable property of being light colored but have the disadvantage of being low swelling, low gelling and low viscosity clays. For some years it has been the practice to blend the naturally occurring alkaline earth bentonites with a mixture of sodium carbonate in efforts to increase the gelling properties thereof. The resultant masses do have gelling properties somewhat greater than that of the untreated bentonites, but their gelling and other properties are inferior to those of the naturally occurring sodium benonites, and in addition contain the non-montmorillonite fractions originally occurring therein and also the reaction by-products thereof and sodium carbonate still in the system.

While naturally occurring sodium bentonites may be used as starting materials in the practice of the present invention to produce novel modified montmorillonites, the more important and the prime aim of this invention is directed to using naturally occurring alkaline earth bentonites as starting materials in the practice of the invention.

The common naturally occurring crude alkaline earth bentonites as mined consist essentially of calcium and/or magnesium montmorillonite together with equilibrium water, quartz and cristobalite and are sometimes veined with reddish iron oxide. These naturally occurring crude alkaline earth bentonites are mined in pieces of various dimensions and appear to have the hardness of a hard soap. These crude alkaline earth bentonites are treated in the following manner to produce unique and highly useful modified montmorillonites:

(1) The crude naturally occurring alkaline earth bentonites are heated to and maintained at a temperature of about 220° F.–about 230° F. in a rotating drum drier for a sufficient length of time to drive off sufficient water of the bentonite to render it water-slakeable. This slakeable product, contains no more than 15% and preferably no more than about 10% by weight of water, is now slaked or rehydrated.

(2) The slaking or rehydration is effected by violently mixing together 10–30 parts by weight of said slakeable product in 90–70 parts by weight of water whereby there is produced a substantially uniform mass in the form of a slurry.

(3) The slurry is subjected to violent agitation by subjecting same to the action of a "Cowles Dissolver High Shear Mixer" for an extended period of time, which may vary from 30–90 minutes or more depending upon the amount of slurry being processed. In this operation, the particle size of the rehydrated clay-mineral component of the mass was reduced to no greater than about 0.5 micron and most of it is now in the range of 0.2–0.5 micron and the adhesion of the other components, namely the quartz or sand and cristobalite to the particles of rehydrated clay-mineral component appears to have been reduced. The quartz and cristobalite are present respectively in particle sizes of 2–80 microns and 0.5–2 microns. The particles of cristobalite and quartz or sand loosened from the rehydrated clay-mineral component of said mass cannot practicably commercially be removed simultaneously substantially completely from the rehydrated clay-mineral by screening or centrifuging. This is due to the particle size of the cristobalite being close to that of the rehydrated clay-mineral.

(4) The sand or quartz component is preferably removed and may be removed by screening the mass through a 270 mesh screen. In this operation practically all of the quartz or sand component is removed before the next step. The remainder of said mass passing through the screen consists essentially of the rehydrated clay-mineral in water and most of the cristobalite originally present in the raw bentonite. However if desired the quartz or sand need not be removed at this stage, but may be screened out after the clay-mineral fraction of said mass is modified as set forth in the next paragraph herein to reduce the particle size thereof to less than 0.1 micron.

(5) I was surprised to discover that said remainder could be treated to provide a mass capable of having the cristobalite component substantially completely separated and removed therefrom in a commercially practicable way. For that purpose and for other purposes of this invention, the remainder, which consists essentially of an aqueous slurry of the clay-mineral and cristobalite originally in said alkaline earth bentonite, is treated with one or a combination of two or more compounds to replace a portion of the exchangeable alkaline earth cations in said clay-mineral with (II) ammonium with or without sodium and/or lithium. The compounds and proportions of said compounds to the clay-mineral in said remainder are so chosen as to affectuate said substitution thereby to provide unique modified clay-mineral fractions, or modified montmorillonites as heretofore defined in column 3 of the present description. I discovered that by so doing, substantially all of the so modified clay-mineral component in said remainder is unexpectedly in particle size of less than 0.1 micron and therefore is in such condition that the cristobalite fraction is commercially separable therefrom. Said unique modified montmorillonites in said remainder are produced by combining with said remainder water-soluble material capable of supplying the desired cations for replacing exchangeable alkaline earth cations therein and preferably capable of supplying anions combinable with or itself otherwise being combinable with the replaced exchangeable alkaline earth compounds thereby to insolubilize the replaced exchangeable alkaline earth cations by the production of water insoluble compounds or complexes therewith which have a solubility in water at 20° C. of less than .01%.

The compounds which I employ for supplying exchangeable ammonium, sodium and lithium cations for replacing other cations are water soluble salts, some examples of which are ammonium carbonate, ammonium citrate, ammonium phosphate, ammonium oxalate, ammonium fluoride, sodium carbonate, sodium acetate, sodium fluoride, sodium oxalate, lithium carbonate, lithium citrate and lithium oxalate. Some of them and especially the oxalates and fluorides for example provide anions which insolubilize the replaced exchangeable alkaline earth cations, and therefore are effective for the aforesaid purposes, I prefer however to employ compounds which are not toxic. The compounds which I prefer to employ are the carbonates, which supply the desired cations and also the carbonate anions. However when ammonium carbonate is used, I prefer to use in addition thereto sodium pyrophosphate which aids in the insolubilization of the replaced exchangeable alkaline earth cations. The pyrophosphate not only serves to insolubilize or aid in the insolubilization of the replaced exchangeable alkaline earth cations. It serves the additional purpose of acting as a dispersing or thinning agent. It has the further desirable characteristic of being degraded at 220°–230° F. The pyrophosphate may be omitted and if so the treatment of the remainder may be effectuated with ammonium carbonate together with sufficient ammonium hydroxide to maintain the pH thereof above 9 to prevent the formation of water-soluble alkaline earth bicarbonates which might otherwise occur due to the mass taking up carbon dioxide from the atmosphere thereby assuring that the resultant mass produced will be substantially free of water soluble, ionizable alkaline earth compounds.

(6) The so treated remainder, consisting essentially of an aqueous mass containing the so chemically modified clay-mineral, cristobalite, and insolubilized replaced exchangeable alkaline earth metal cations, is centrifuged to separate therefrom both the cristobalite and the insoluble, alkaline earth compounds formed by the insolubilization of the replaced alkaline earth. The chemically modified clay-mineral fraction in water is recovered after said separation.

(7) The recovered so chemically modified clay-mineral fraction or modified montmorillonite in water, is a unique product of the invention and except for the water consists essentially of the so chemically modified clay-mineral component or the so modified montmorillonite of the original alkaline earth bentonite and is substantially free of the quartz, cristobalite, and the replaced exchangeable alkaline earth cations. The recovered so chemically modified clay-mineral fraction (at least 95% pure) in water is a commercial product, but it is preferable that it be dried in any convenient manner, i.e. a drum heater at 220°–230° F., to drive off at least 90% of the water and degrade the pyrophosphate if present, thereby to produce substantially dry sheets or flakes of a dry solid which may be converted to the powdered condition, and in such condition is a preferred commercial composition of matter. Said preferred compositions of matter apart from the water content thereof consist essentially of modified naturally occurring montmorillonites as defined in the hereinbefore eleventh paragraph of the present description and are characterized as follows:

(I) When 5 parts by weight thereof are combined with 95 parts by weight of water and the mixture is violently agitated, there are produced colloidal dispersion of different viscosities at 25° C. depending upon the proportion of exchangeable alkaline earth cations in the original bentonite which has been substituted by (II) and also proportion of (II) employed. Five percent colloidal dispersions of some of them have viscosities lower than 100 centipoises at 25° C. This unexpected characteristic is of significantly obvious importance of easy mixability with other components, and especially with those which are solids or thick, in the preparation of end products. Still another unexpected and greatly desirable characteristic of some of them would have a pH of about 8 is evidenced by the fact that when said 5% colloidal suspension thereof whose viscosity is no greater than 100 centipoises at 25° C. is treated with an acidic agent, such as dilute HCl or with an alkaline agent such as dilute NaOH, to either lower or raise the pH thereof from about 8 to 1 or from about 8–12, the viscosity at 25° C. rises and continues to rise to above 1000 centipoises upon increasing or decreasing the pH thereof, without reducing the stability of the dispersions so produced.

(II) All of said unique chemically modified clay-mineral products, which are chemically modified montmorillonite products, whether in water or in the dry state may be combined with Mix AC in proportion 100 parts thereof on a dry basis to Mix AC to provide systems which apart from the moisture content therein are substantially free of non-montmorillonite components present in the naturally occurring alkaline earth bentonites from which said modified montmorillonite products were derived, except for the small amounts of substances therein due to the addition of said Mix AC. Five percent aqueous colloidal suspensions of said systems on a dry basis have viscosities at 25° C. considerably and significantly greater than the corresponding viscosity of similar systems of the rehydrated naturally occurring alkaline earth bentonite.

Said unique chemically modified montmorillonite products, as well as the resultant systems produced therewith will find application and use as components in a variety of different fields, such as the industrial fields (as fire extinguishing media, etc.) the fields of dentifrices, pharmaceutical preparations, cosmetics, comestibles, etc.

Those prepared with nontoxic reactants are employable as comestibles due to their compatibility with other gelling or thickening agents now employed in food products, such as ice cream, and gelatin desserts and the so-called cooked starch instant puddings prepared with hole milk, and may be substituted entirely for or only in part for the gelling or thickening agents used therein. They are also useful in the pharmaceutical, cosmetic and comestible preparations to function as or assist in the following typical functions: thickener — Desiccant, binder — Hydrophillic Carrier and Water Dispersing Catalyst, gellant—Antiphlogistic Conditioner and Demulcent, lubricant — Acid Neutralizer and Buffer, suspension agent—Protective Colloid, emulsion stabilizer—Stabilizer for Organic Gums and Flavorings, film former—Detergent Additive, penetrant—Foam Stabilizer, sorbent—Clarifier.

The following are specific examples representative of the present invention and are given by way of illustration and not limitation:

EXAMPLE 1

One hundred pounds of crude calcium bentonite, which is Helms crude bentonite of Gonzales, Texas and containing practically all of the equilibrium water naturally occurring therein when mined, is in pieces of different sizes varying from about 1"–12" in its greatest dimension. This crude bentonite is further characterized by being "veined" with iron oxide. The crude bentonite as mined and before an appreciable quantity of the naturally occurring equilibrium water therein has been removed therefrom, is preferably first treated to remove the iron oxide component therefrom. This is effected by tumbling a charge of the pieces of freshly mined Helms crude in a rotating (50–100 r.p.m.) screen cylindrical chamber whose lower half is immersed in a tank of running water. Due to the rotation of the chamber the water wet pieces of the bentonite are tumbled whereby they break up into smaller size pieces at the iron oxide vein lines or planes which are the weak planes thereby to expose the iron oxide surfaces which are "scraped" off due to attrition between the exposed faces of the individual pieces and also against the screen. Due to this scrubbing or scraping action, the particles of iron oxide are removed from the crude bentonite and then are carried by the water out of the tank. By maintaining said crude bentonite in contact with the water in the tank during said operation, no naturally occurring water in said bentonite is removed. The wet pieces of the so treated and so purified raw bentonite product are removed from the chamber. Then said so refined product is rendered slakeable in any suitable manner, e.g. using a drum drier or the like, in the temperature range of about 220°–about 230° F. The resultant slakeable bentonite product is rehydrated by charging and mixing same in a mixing chamber containing about 85 pounds of water for each 15 pounds of said slakeable bentonite added thereto. In this manner a 15% slurry is produced and is now subjected to the action of a "Cowles Dissolver High Shear Mixer" over a half hour period, whereby the particle size of the rehydrated clay-mineral component thereof is reduced to about 0.2–0.5 micron and the adhesion of the non-mineral components therein to said clay-mineral component appear to be reduced. The non-mineral components are present as cristobalite in particles of 0.5–2 microns and as quartz or sand in particles of 2–80 microns. The mass is now charged onto a 270 mesh vibrating screen whereby the silica or sand component therein as well as any other material of greater than said mesh size are substantially completely separated and removed therefrom and the resultant slurry passing through the screen is collected. The resultant slurry which consists essentially of cristobalite and rehydrated calcium bentonite in water is maintained under constant agitation. And, while so maintained there is added thereto 12 pounds of a freshly prepared aqueous solution consisting of 1.7 pounds of ammonium carbonate in 10.3 pounds of water. After the addition of the ammonium carbonate solution, agitation is continued for an additional 30 minutes for assuring completion of substitution of the available ammonium cations for the exchangeable calcium ions therein. In order to prevent the replaced calcium from being in or converted to a water soluble form, the foregoing may be conducted under a nitrogen atmosphere or under pH conditions above 9 by the use of ammonia which assures the insolubilization of the replaced calcium cations. However, for that purpose, I prefer to add to the mass immediately after said 30-minute period 11 pounds of an aqueous solution consisting of 2.3 pounds of tetrasodium pyrophosphate which acts as a thinner therefor which is a definite advantage in the agitation step and does also act to insolubilize or aid in the insolubilizing of the replaced exchangeable calcium cations and/or to maintain them in insolubilized condition. By using said pyrophosphate the entire operation may be conducted in a vessel open to the atmosphere and does not require the use of ammonium hydroxide. This pyrophosphate was chosen because of the aforesaid characteristics and also because it can be degraded at temperatures of 220°–230° F. hereinafter used in forming the dry novel modified montmorillonite products of this invention.

Then the so treated or reacted remainder, characterized by the so modified montmorillonite therein being of particle size of less than 0.1 micron, is now centrifuged by means of a DeLaval continuous nozzle-type centrifuge to separate substantially all of the cristobalite and the insolubilized calcium from the aqueous slurry of the so modified montmorillonite. This slurry, which is the overflow in said centrifuging consists essentially of said modified montmorillonite in water and contains less than 2% of impurities and this novel slurry is known as Product 1S. This slurry Product 1S is now dried by using a drum drier at about 220°–230° F. whereby practically all of its water component is driven off and the so modified montmorillonite component is recovered in the form of substantially dry solid flakes or sheets containing up to about 10% by weight of moisture. The substantially dry so modified montmorillonite flakes or sheets are converted into a fine powder, and all of them whether in sheet, flake, powdered or other physical form are novel products of this invention and are known as Product 1M. Product 1M is a very white solid of high degree of purity and apart from the water therein consists of at least 98% by weight of so-modified montmorillonite, is nontoxic and stable under normal conditions of storage and shipment. Product 1M contains about 25 milliequivalents of exchangeable calcium cations and about 45 milliequivalents of exchangeable ammonium cations per 100 grams thereof and so differs greatly from the montmorillonite which was present in the crude bentonite and which contained about 70 milliequivalents of exchangeable calcium cations per 100 grams thereof. Product 1M which is unique and a product of commerce, which can be packaged and shipped and is ready for use, has other unique characteristics some of which are:

When a mixture of 5 grams Product 1M in 95 grams of water is agitated in a "Waring Blendor" for a period of about 5 minutes, there is unexpectedly produced a colloidal suspension, Product 1CS, which has a viscosity of less than 50 centipoises at 25° C. Such low viscosity suspension and even others of greater viscosity due to the percent of Product 1M therein are also products of commerce.

Said low viscosity suspension of Product 1M has an unexpected pH of about 8 and has also the startling unexpected property than when its pH is increased to about 12 or decreased to about 1 by adding dilute sodium hydroxide or dilute hydrochloric acid thereto, the viscosity thereof increases progressively over the pH ranges of 8–12 and 8–1 whereby there may be obtained 5% stable dispersions or gels in the pH range of 1–12 and of viscosities between less 50 centipoises and up to above 1000 centipoises at 25° C. depending upon the pH thereof. By varying the amount of Product 1M in a fixed quantity of water and then varying the pH of the colloidal dispersions, there may be produced a great number of stable dispersions which differ from each other in viscosity and/or pH in the range of about 1 to about 12.

One hundred grams of Product 1M, which contains about 10% by weight of water and preferably in the powdered condition, is mixed or blended with Mix AC to provide a substantially uniform mix or blend. The blend or mix is allowed to stand in a room at 70° F. for a period of 48 hours. The resultant system is known as Product 1R.

At the end of that period 5 grams of Product 1R is charged into and then agitated with 95 grams of water in a Waring Blendor for 5 minutes whereby there is produced a dispersion or gel, Product 1G, which is stable and therefore does not bleed or have any water separating out. Product 1G has a viscosity of 2360 centipoises at 25° C.

EXAMPLES 2–12

Repeat Example 1 up to and including the step for producing Product 1S, except that instead of using 1.7 pounds of ammonium carbonate and 2.7 pounds of tetrasodium pyrophosphate, substitute appropriately proportionately lesser and greater amounts of ammonium carbonate and ascertainable by simple calculation obvious to those skilled in the art in view of the teaching in Example 1 together with proportionate amounts of the pyrophosphate whereby there are produced slurries, known as Products 2S–12S. (For example only .9 pound of ammonium carbonate and 1.3 pounds of the pyrophosphate are used in Example 4.)

The Products 2S–12S are dried, in the same manner that Product 1S was dried, whereby there are obtained respective dry Products 2M–12M.

Products 2M–12M are processed in the manner of producing Product 1M of Example 1, whereby there are produced Products 2R–12R.

Repeat last paragraph of Example 1, but substitute Products 2R–12R respectively for Product 1R therein whereby there are obtained Products 2G–12G, all of which are stable, that is substantially homogeneous or uniform gels or aqueous colloidal dispersions which are very stable at 70° F., as evidenced by having the characteristics of non-bleeding and no water-separating out over extended periods of time.

Products 2M–12M differ from Product 1M in the number of milliequivalents of exchangeable calcium cations, the number of milliequivalents of exchangeable ammonium cations and when present in significant numbers, the number of milligrams of sodium and/or lithium per 100 grams thereof as shown in the following table. The table also shows the viscosities of 5% aqueous colloidal dispersions of the different dispersions of 2G–12G.

EXAMPLE 13

Repeat Example 1 up to and including the step for producing Product 1S, except that the pyrophosphate is omitted and in place of the 1.7 pounds of ammonium carbonate substitute 20 ounces of ammonium carbonate and then add about 8 ounces of sodium carbonate whereby slurry, Product 13S is produced.

Product 13S is dried, in the same manner as Product 1S, whereby there is produced Product 13M.

Product 13M is processed in the same manner used to produce Product 1R from 1M, whereby there is produced Product 13R.

Repeat last paragraph of Example 1, except substitute Product 13R therein for Product 1R, thereby to obtain Product 13G which is a stable colloidal suspension, known as Product 13. Certain of the characteristics of Products 13M and 13G are shown in the table.

EXAMPLE 14

Repeat Example 13, except for the 8 ounces of sodium carbonate substitute 4 ounces of sodium carbonate and 3 ounces of lithium carbonate. Certain characteristics of Product 14M and 14G produced in this example are shown in the table.

EXAMPLE 15

Ten parts by weight of a naturally occurring crude bentonite from Wyoming is used as the starting material. It is of amber color. It is heated to drive off sufficient water to render it slakeable. A sample thereof analyzed for exchangeable cations which were found to be about 60 sodium milliequivalents per 100 grams of the sample.

Five parts by weight of said slakeable sodium bentonite is mixed with 95 parts of water, using the Cowles apparatus of Example 1 whereby a substantially uniform slurry is produced. Then this slurry is passed through the De-Laval centrifuged whereby the non-montmorillonite solid fraction is separated therefrom and the remainder is recovered.

A quantity of said remainder containing 100 pounds of montmorillonite (on a dry basis) while being maintained under constant agitation is mixed with 10 pounds of an aqueous solution containing 1 pound of ammonium carbonate. Agitation is continued for 15 minutes thereafter whereby there is produced a modified montmorillonite containing 24 milliequivalents of ammonium and 36 milliequivalents of sodium per 100 grams thereof. At this stage while agitation is still continued, the mass has added a 10 pound aqueous solution containing 2.3 pounds of calcium acetate. Agitation is still continued for 15 minutes thereafter. The mass is heated to about 220°–230° F. in a drum drier thereby to obtain a dry product which, apart from some moisture therein, consists essentially of modified sodium montmorillonite and is known as Product 15M. A 5% colloidal aqueous suspension product 15M has the unexpected property of being a straw-colored stable suspension having a viscosity of 1600 centipoises at 25° C.

Some of the characteristics of Product 15M are shown in the table. Product 15M is processed in the same manner used to produce Product 1R and 1M, whereby there is produced Product 16R.

Repeat last paragraph of Example 1 except that for Product 1R substitute Product 16R, thereby to obtain Product 16G which is a straw-colored stable colloidal suspension having a viscosity of 1240 centipoises at 25° C.

EXAMPLE 16

Repeat Example 15 up to and including the production of Product 15M, except that instead of 1 pound of ammonium carbonate use 10 ounces of ammonium carbonate, then use 44 ounces of calcium acetate and finally 3 ounces of lithium acetate, thereby to produce Product 16M. Product 16M is processed in the same manner used to produce Product 1R with 1M, whereby there is produced Product 16R. Repeat last paragraph of Example 1 except that for Product 1R substitute 16R thereby to obtain Product 16G which is also a stable colloidal suspension. Certain of the characteristics of Product 16M are shown in the table.

EXAMPLE 17

Repeat Example 15 up to and including the production of Product 15M, except that instead of 1 pound of ammonium carbontae use 19 ounces of ammonium carbonate, then use 30 ounces of calcium acetate thereby to produce Product 17M. Product 17M is processed in the same manner used to produce Product 1R with 1M, whereby there is produced Product 17R. Repeat last paragraph of Example 1, except that for Product 1R substitute 17R thereby to obtain Product 17G which is also a stable colloidal suspension. Certain of the characteristics of Product 17M are shown in the table.

EXAMPLE 18

Repeat Example 17, except use 13 ounces of ammonium carbonate and then use 22 ounces of magnesium chloride, whereby there is obtained Product 18M which in turn was converted into Products 18R and 18G in the manner of producing 16R and 16G. Some of the characteristics of Products 18M are likewise shown in the table.

EXAMPLE 19

A quantity of said remainder of Example 15 which contains 200 parts of montmorillonite (on a dry basis) while being constantly agitated is mixed with an amount of calcium chloride in excess and about twice that theoretically required for replacing all of the exchangeable sodium cations therein with calcium, agitation is continued for 15 minutes thereafter and finally the mass was washed with 5 times its volume of deionized water to wash out excess calcium chloride by-products of reaction. The foregoing is repeated three more times whereby there is obtained a slurry of Product (z) which is a montmorillonite whose exchangeable cations are now substantially all calcium. The aqueous slurry of product (z) is now adjusted to 5% concentration of (z) therein. To 2000 grams of said 5% slurry while being agitated there are added 1.25 grams of ammonium carbonate and 2 grams of tetrasodium pyrophosphate. Agitation is continued for 15 more minutes. Then the mass is treated in the manner of slurry 1S of Example 1 to provide modified montmorillonite, Product 19M. Product 19M is treated in the manner of Example 1 to produce the R and G products therein whereby there are produced Products 19R and 19G. Some characteristics of 19M and 19G are shown in the table.

EXAMPLES 20–21

Employ same procedures and components as Example 1, except use proportionately lesser amounts of ammonium carbonate and sodium phosphate to provide Products 20M and 21M.

Also, if desired, the slakeable alkaline earth bentonites may be intimately combined with the requisite amounts of ammonium carbonate, and then with or without the sodium and/or lithium salts thereby to produce improved bentonites whose montmorillonite fractions have been modified thereby to convert them to Products, examples of which are Products 2M–14M. Then 100 parts of the resulting masses with so modified montmorillonites therein may then be intimately combined with Mix AC to provide systems of high gelling modified crude alkaline earth bentonites.

And, if desired, the slakeable sodium bentonites may likewise be treated with appropriate reactants in appropriate proportions to provide masses containing Products 15M–19M therein and they in turn, if desired, may in like manner be intimately mixed with Mix AC to provide novel systems.

It is also to be emphasized that whatever the number of exchangeable cations in the clay-mineral fraction of a particulal alkaline earth bentonite used as the starting material, the clay-mineral fraction is so treated in the general manner heretofore described whereby it is so modified that like the others before described its exchangeable cations consist essentially of the following expressed in milligrams per 100 grams thereof: calcium and/or magnesium at least 5; ammonium at least 5; and 0–20, both inclusive, of sodium and/or lithium. The following Examples 22 and 23 are illustrations thereof.

EXAMPLE 22

An alkaline earth bentonite from a deposit in New Mexico contained a clay-mineral fraction (montmorillonite) whose exchangeable cations consisted essentially of calcium measuring about 26 milliequivalents per 100 grams thereof. One portion thereof was treated in the manner described in Example 1 herein, but employing proportionately lesser amounts of ammonium carbonate and sodium pyrophosphate whereby the clay-mineral fraction thereof was modified and separated from the nonclay-mineral components and is known as Product 22M which was treated as before to provide Product 22G, the characteristics thereof shown in the table.

EXAMPLE 23

Another portion of said New Mexico alkaline earth bentonite of Example 22 was also treated in the manner of Example 1 herein, but using proportionately even lesser amounts of ammonium carbonate and sodium pyrophosphate whereby the clay-mineral fraction thereof was modified and separated from the nonclay-mineral components and is known as Product 23M which was treated as before to provide Product 23G, the characteristics thereof shown in the table.

These Products 22M and 23M are of high purity, at least 98%, have high G.E. brightness and are very white as shown by their comparatively low whiteness index values as determined by the reflectance spectrophotometer. Consequently they, as well as the other pure products, such as 1M–14M, find utility in high grade products where these characteristics of brightness and whiteness are prerequisites.

| Products | Milliequivalents of Exchangeable Cations/100 grams | | | | Viscosity, cps. (25° C.) | 5% Dispersions of Products |
|---|---|---|---|---|---|---|
| | Ca | NH₄ | Na | Li | | |
| 20M | 65 | 5 | | | 150 | 20G |
| 21M | 60 | 10 | | | 350 | 21G |
| 2M | 55 | 15 | | | 600 | 2G |
| 3M | 50 | 20 | | | 700 | 3G |
| 4M | 45 | 25 | | | 840 | 4G |
| 5M | 40 | 30 | | | 1,000 | 5G |
| 6M | 35 | 35 | | | 1,450 | 6G |
| 7M | 30 | 40 | | | 1,950 | 7G |
| 1M | 26 | 44 | | | 2,320 | 1G |
| 8M | 20 | 50 | | | 1,800 | 8G |
| 9M | 15 | 55 | | | 1,060 | 9G |
| 10M | 10 | 60 | | | 800 | 10G |
| 11M | 5 | 65 | | | 250 | 11G |
| 12M | 3.5 | 66.5 | | | 24 | 12G |
| 13M | 25 | 35 | 10 | | 1,800 | 13G |
| 14M | 25 | 35 | 5 | 5 | 2,000 | 14G |
| 15M | 26 | 24 | 10 | | 1,600 | 15M |
| 16M | 30 | 15 | 10 | 5 | 1,480 | 16M |
| 17M | 20 | 30 | 10 | | 1,420 | 17M |
| 18M | ¹30 | 20 | 10 | | 1,480 | 18M |
| 19M | 26 | 34 | | | 2,400 | 19G |
| 22M | 16 | 10 | | | 1,760 | 22G |
| 23M | 20 | 6 | | | 1,850 | 23G |

¹ (Mg).

The viscosities of Products 16G–18G at 25° C. were approximately the same as that of 15G, 1240.

Said New Mexico deposit may be modified in accordance with this invention to provide a wide variety of clay-mineral fractions thereof modified in accordance with this invention.

To the New Mexico deposit of alkaline earth bentonite is added sufficient water to make a slurry and there is added thereto sufficient alkaline earth (calcium and/or magnesium) chloride, acetate or the like to increase the exchangeable alkaline earth cations therein to a value of 60 or more, and is subsequently treated with sufficient amount of an ammonium compound in the general manner of Example 1 herein whereby said original clay-mineral fraction is so modified that it shall contain 5–55 milliequivalents of exchangeable alkaline earth and 5–55 milliequivalents of exchangeable ammonium cations thereby to provide other derivatives of the clay-mineral fraction which are similar to Products 1M–21M.

The various novel modified clay-mineral fractions heretofore described, as well as said bentonites containing them as portions thereof and also said bentonites either in the raw or slakeable conditions are combined with one or more components to provide systems of improved gelling qualities.

Said modified clay-mineral fractions, examples of which are Products 1M–23M are treated with (B) a source of available sodium and/or lithium, examples of which are sodium carbonate and sodium chloride as hereinbefore set forth. Some other examples of (B) are obvious equivalents, such as, sodium hydroxide, lithium hydroxide, lithium carbonate, sodium sulfate, lithium sulfate as well as other highly ionizable sodium or lithium containing compounds. In general, the sources of sodium and/or lithium used, are hydroxides and water-soluble inorganic salts of said metals. It is preferred to also employ a buffer, such as sodium or lithium acetate, etc. for stabilization. Such organic salts are not necessary, however. The quantity of (B) used together with the previously modified clay-mineral fractions (montmorillonites) of said bentonites, either in purified or unpurified condition, is sufficient to provide available sodium and/or lithium ions in amount at least equivalent to the total amount of exchangeable ammonium and exchangeable calcium and/or magnesium ions in said modified clay-mineral fractions.

Instead of first modifying the clay-mineral fractions of said bentonites and then mixing (B) therewith to produce said novel systems, other useful and marketable compositions of this invention may be produced. Said bentonites in the raw condition and even before being dried may be comminuted and mixed with appropriate materials to provide compositions which when rendered slakeable, are of high gelling characteristics. It is preferred however, to render the bentonite slakeable and in comminuted condition either in the presence or absence of the other materials. If said materials are not present at said stage, they are later added preferably in comminuted form, thereby to provide the novel systems.

When the bentonite used is one of the alkaline earth type, the slakeable bentonite is comminuted to a powdery condition and there is mixed therewith simultaneously or one after the other in any order: (C) a water soluble source of ammonium in amount sufficient to provide available ammonium ions in amount at least equivalent to 5 and preferably at least equivalent to 10 milliequivalents of the total amount of exchangeable alkaline earth cations per 100 grams of the clay-mineral portion of said bentonite and preferably no greater than an amount equivalent to said total less 10 per 100 grams of said clay-mineral portion of said bentonite, and (B) a source of sodium and/or lithium in amount sufficient to provide available sodium and/or lithium ions in amount at least equivalent to the total amount of said ammonium and alkaline earth cations.

The quantity of (B) employed in said systems is a minor amount thereof, 4–6 parts thereof per 100 parts of said previously modified or unmodified clay-mineral fractions. If desired said amount of (B) may be increased up to 20 or even 100 parts thereof; however, 6 parts is more than sufficient to provide the necessary available sodium ions.

The quantity of (C) employed is dependent upon the particular alkaline earth bentonite to be treated and also upon the number of exchangeable calcium and/or magnesium cations that are to be replaced by ammonium. Examples of (C) are those ammonium compounds hereinbefore set forth.

EXAMPLE 24

One hundred parts of raw alkaline earth bentonite, (Helms) dried to 10% moisture content, and containing approximately 40 milliequivalents of exchangeable calcium per 100 grams thereof was pulverized and then intimately admixed with 1 part of finely divided ammonium carbonate, and 4.5 parts of finely divided sodium carbonate to provide a substantially uniform mix. This mix known as Product 1B is another novel product of this invention. A 10% dispersion of the dried bentonite had viscosity at 25° C. of 164 centipoises and a corresponding dispersion of Product 1B had a viscosity at 25° C. of 450 centipoises.

EXAMPLE 25

One hundred parts of raw alkaline earth bentonite, dried to 10% moisture content, and containing approximately 40 milliequivalents of exchangeable magnesium per 100 grams thereof was pulverized and then intimately admixed with 1 part of finely divided ammonium carbonate and 5 parts of lithium chloride to provide a uniform mix, known as Product 2B, another novel product of this invention. A 10% dispersion of the raw bentonite at 25° C. was 10 centipoises and that of Product 2B was 500 centipoises.

EXAMPLE 26

One hundred parts of raw alkaline earth bentonite, (Helms) dried to 10% moisture and containing approximately 70 millilequivalents of calcium per 100 grams of the clay-mineral fraction thereof was intimately combined with finely divided ammonium carbonate in amount to provide ammonium ions equivalent to about 45 milliequivalents of said calcium and about 5 parts of sodium carbonate thereby to provide a uniform mix, known as Product 3B, a 10% aqueous dispersion of which at 25° C. is 700 centipoises.

The common sodium bentonites are characterized by consisting of a clay-mineral fraction measuring at least about 90% by weight thereof, with exchangeable cations in said clay-mineral fraction consisting essentially of sodium. However, said bentonites include as components in the nonclay fraction thereof source of said alkaline earth in amounts sufficient to provide at least 5 milliequivalents of alkaline earth ions per 100 grams thereof. These bentonites are: with or without the addition of an amount of water-soluble alkaline earth compound to provide sufficient available alkaline earth ions in amounts up to about 40 milliequivalents thereof per 100 grams of the clay-mineral fraction thereof: mixed with a water-soluble source of ammonium in amount to provide at least 5 milliequivalents and preferably at least 10 milliequivalents of available ammonium per 100 grams thereof thereby to provide high gelling systems.

EXAMPLE 27

One hundred parts of comminuted slakeable Wyoming (sodium) bentonite and about 0.7 part of finely divided ammonium carbonate was intimately mixed together to provide a fairly uniform mass or system, another product of this invention known as Product 3B. A 10% aqueous dispersion of 3B had a viscosity of 1620 centipoises at 25° C. The viscosity at 25° C. of a 70% aqueous dispersion of this slakeable bentonite alone was 760 centipoises.

It is to be understood that if desired the whole raw alkaline earth bentonite which has been rendered slakeable, may be mixed with an appropriate quantity of source of ammonium sufficient to modify the clay-mineral fraction therein so that when mixed with water to form a slurry, the particle size of the modified montmorillonite will be smaller than that of the cristobalite and less than 0.1 micron. Then said slurry may be produced and the cristobalite separated therefrom by centrifugation, settling etc. This is an alternate method, to that of Example 1. In either case, the clay-mineral fraction has been treated with the ammonium compound whereby the alkaline earth ions are replaced by the ammonium ions to the desired degree.

The various 1M–14M, 20M–23M and their corresponding R and G products besides high purity, have the further unique characteristics of G.E. brightness of at least 85% and whiteness index below 11 as measured with a reflectance spectrophotometer.

By the term "montmorillonite" used in the present description and claims, I means only those clay-mineral fractions, that is the montmorillonites, naturally occurring in sodium bentonites and alkaline earth bentonites. The numbers of exchangeable cations as set forth in the present description and claims are all determined by the standard Versenate method. The viscosities as set forth in the present description are all determined at 25° C. with a Brookfield viscosimeter. All "parts" in the present description and claims are by weight unless otherwise specified.

It is also to be understood that the following claims are intended to cover all the generic and specific features of the invention herein described, and all statements of the scope of the invention which as a matter of language might be said to fall therebetween.

I claim:

1. A composition of matter comprising a modified montmorillonite whose exchangeable cations consist essentially of the following cations measuring per 100 grams thereof:

about 15–40 milliequivalents of calcium and/or magnesium;
about 30–55 milliequivalents of ammonium; and
0–20, both inclusive, milliequivalents of sodium and/or lithium; said composition of matter being substantially free of water soluble ionizable alkaline earth compounds.

2. A composition of matter according to claim 1, the milliequivalents of said calcium and/or magnesium being at least 20 and not greater than 30; and the milliequivalents of said ammonium being at least 40 and no greater than 50.

3. A composition of matter according to claim 1, the milliequivalents of said calcium and/or magnesium being about 25; and the milliequivalents of said ammonium being about 45.

4. A system comprising a water soluble source of available sodium and/or lithium ions and a composition of matter according to claim 1, the amount of said source being sufficient to provide available sodium and/or lithium ions in amount at least equivalent to the total amount of exchangeable ammonium and exchangeable calcium and/or magnesium ions in said modified montmorillonite.

5. A system comprising a water soluble source of available sodium and/or lithium ions and a composition of matter according to claim 2, the amount of said source being sufficient to provide available sodium and/or lithium ions in amount at least equivalent to the total amount of exchangeable ammonium and exchangeable calcium and/or magnesium ions in said modified montmorillonite.

6. A system comprising a water soluble source of available sodium and/or lithium ions and a composition of matter according to claim 3, the amount of said source being sufficient to provide available sodium and/or lithium ions in amount at least equivalent to the total amount of exchangeable ammonium and calcium and/or magnesium ions in said modified montmorillonite.

7. A method for separating cristobalite from the montmorillonite fraction in an aqueous slurry of a mass comprising a slakeable montmorillonite and cristobalite containing fraction of a naturally occurring alkaline earth bentonite, comprising treating and agitating said slurry with a water soluble ammonium compound, whose anions are capable of insolubilizing alkaline earth cations, to replace exchangeable alkaline earth cations in said montmorillonite with ammonium and to insolubilize said replaced cations, the amount of said compound being such that the alkaline earth cations are substituted by ammonium in amount sufficient that the particle size of the so modified montmorillonite therein is less than that of the cristobalite and less than 0.1 micron, and then separating said cristobalite therefrom.

8. A method according to claim 7, centrifuging said slurry to separate said cristobalite therefrom.

9. A method according to claim 7, said compound being ammonium carbonate.

10. A method according to claim 7, said slurry treated also with sodium pyrophosphate and said ammonium compound being ammonium carbonate.

11. A method for producing a composition of matter which is substantially free of water soluble, ionizable calcium and/or magnesium compounds and including a modified montmorillonite whose exchangeable cations consist essentially of the following cations measuring per 100 grams thereof about 15–40 milliequivalents of calcium and/or magnesium, about 30–55 milliequivalents of ammonium comprising treating an aqueous slurry of a naturally occurring alkaline earth montmorillonite, which was rendered slakeable, with a water soluble source of ammonium ions and anions capable of insolubilizing calcium and magnesium ions in amount to replace all except about 15–40 milliequivalents of exchangeable calcium and/or magnesium cations per 100 grams thereof with about 30–55 milliequivalents of ammonium per 100 grams thereof, and to insolubilize in said slurry said replaced calcium and/or magnesium ions with said anions.

(References on following page)

References Cited

UNITED STATES PATENTS 2,966,506   12/1960   Jordan  ------------ 23—112 X
3,326,632   6/1967   Hashizume  ---------- 23—111

OTHER REFERENCES

Mitra et al.: "Chemical Abstracts," vol. 52, 1958, Col. 7811f, P.O. Scientific Lib.

EDWARD J. MEROS, *Primary Examiner.*